(12) United States Patent
Keable

(10) Patent No.: US 8,793,612 B2
(45) Date of Patent: Jul. 29, 2014

(54) PARSING OF INPUT FIELDS IN A GRAPHICAL USER INTERFACE

(75) Inventor: Lawrence James Robert Keable, Buxton (GB)

(73) Assignee: Keycorp Limited, Buxton (GB)

( * ) Notice: Subject to any disclaimer, the term of this patent is extended or adjusted under 35 U.S.C. 154(b) by 219 days.

(21) Appl. No.: 12/670,395

(22) PCT Filed: Jul. 22, 2008

(86) PCT No.: PCT/GB2008/002492
§ 371 (c)(1),
(2), (4) Date: Jan. 22, 2010

(87) PCT Pub. No.: WO2009/013474
PCT Pub. Date: Jan. 29, 2009

(65) Prior Publication Data
US 2010/0251163 A1    Sep. 30, 2010

(30) Foreign Application Priority Data
Jul. 24, 2007 (GB) .................................. 0714394.4

(51) Int. Cl.
G06F 3/048 (2013.01)
(52) U.S. Cl.
USPC ........................... 715/802; 715/767; 715/780
(58) Field of Classification Search
USPC ......................................... 715/767, 780, 802
See application file for complete search history.

(56) References Cited

U.S. PATENT DOCUMENTS

| 5,704,029 | A | 12/1997 | Wright, Jr. |
| 5,796,404 | A * | 8/1998 | Gentner ........................ 715/823 |
| 6,345,278 | B1 * | 2/2002 | Hitchcock et al. ..................... 1/1 |
| 6,363,376 | B1 * | 3/2002 | Wiens et al. ........................... 1/1 |
| 6,775,831 | B1 * | 8/2004 | Carrasco et al. .............. 718/100 |
| 7,188,318 | B2 * | 3/2007 | Spisak ........................... 715/827 |
| 7,320,007 | B1 * | 1/2008 | Chang ............................ 715/700 |
| 7,461,336 | B1 * | 12/2008 | Abramson et al. ............ 715/237 |
| 7,552,400 | B1 * | 6/2009 | Sriver et al. .................... 715/827 |
| 2002/0036620 | A1 | 3/2002 | Tervo |
| 2002/0184396 | A1 * | 12/2002 | Fujikura ....................... 709/310 |
| 2004/0030991 | A1 * | 2/2004 | Hepworth et al. ............ 715/507 |
| 2004/0196314 | A1 | 10/2004 | Bhogal et al. |
| 2005/0177788 | A1 * | 8/2005 | Snyder .......................... 715/523 |

(Continued)

FOREIGN PATENT DOCUMENTS

GB    2340264 A    2/2000

OTHER PUBLICATIONS

"HTML 4.01 Specification," Published by the W3C on Dec. 24, 1999, retrieved on Feb. 11, 2012 from www.w3.org/TR/html4/cover.html and www.w3.org/TR/html4/interact/forms.html.*

(Continued)

Primary Examiner — Tadeese Hailu
Assistant Examiner — Eric J Bycer
(74) Attorney, Agent, or Firm — Chernoff Vilhauer McClung & Stenzel, LLP

(57) ABSTRACT

A parsing method for a graphical user interface interaction process, the method comprising defining a control symbol for direction to a text based input field and defining when the control symbol is input to an input box of a graphical user interface that a processor is directed to the text based input field associated with the control symbol.

19 Claims, 1 Drawing Sheet

(56) References Cited

U.S. PATENT DOCUMENTS

| | | | | |
|---|---|---|---|---|
| 2006/0117271 | A1* | 6/2006 | Keim | 715/789 |
| 2006/0195421 | A1* | 8/2006 | Kilroy | 707/3 |
| 2007/0208993 | A1* | 9/2007 | Ritter | 715/505 |
| 2008/0120257 | A1* | 5/2008 | Goyal et al. | 706/12 |
| 2008/0162426 | A1* | 7/2008 | Haug | 707/3 |
| 2010/0281314 | A1* | 11/2010 | Pettinati | 714/57 |

OTHER PUBLICATIONS

Meissner, GL Parsing or Tokenizing Tables Using Finite State Machines to Direct Program Actions as Well as Program Control Flow, IBM Technical Disclosure Bulletin 01-89, Jan. 1, 1989, pp. 231-235.*

"SplitTbl—Split a string with multiple delimiters," May 15, 1999, retrieved from http://www.devx.com/vb2themax/Tip/18915 on Jul. 29, 2013.*

Patton, Tony, "Easily parse string values with .NET," Jan. 24, 2006, retrieved from http://www.techrepublic.com/article/easily-parse-string-values-with-net/ on Jul. 29, 2013.*

Richard Bloor, "The WDN Symbian DevZone . . . MobileVB development for the Nokia 9200 series continued", www.wirelessdevnet.com/symbian/rb_27.html, Oct. 7, 2002.

Micah Dubinko, "Form Controls", XForms Essentials, Aug. 27, 2003, pp. 1-11.

Piriou, Nominoe, International Search Report for PCT/GB2008/002492, Jun. 11, 2009.

* cited by examiner

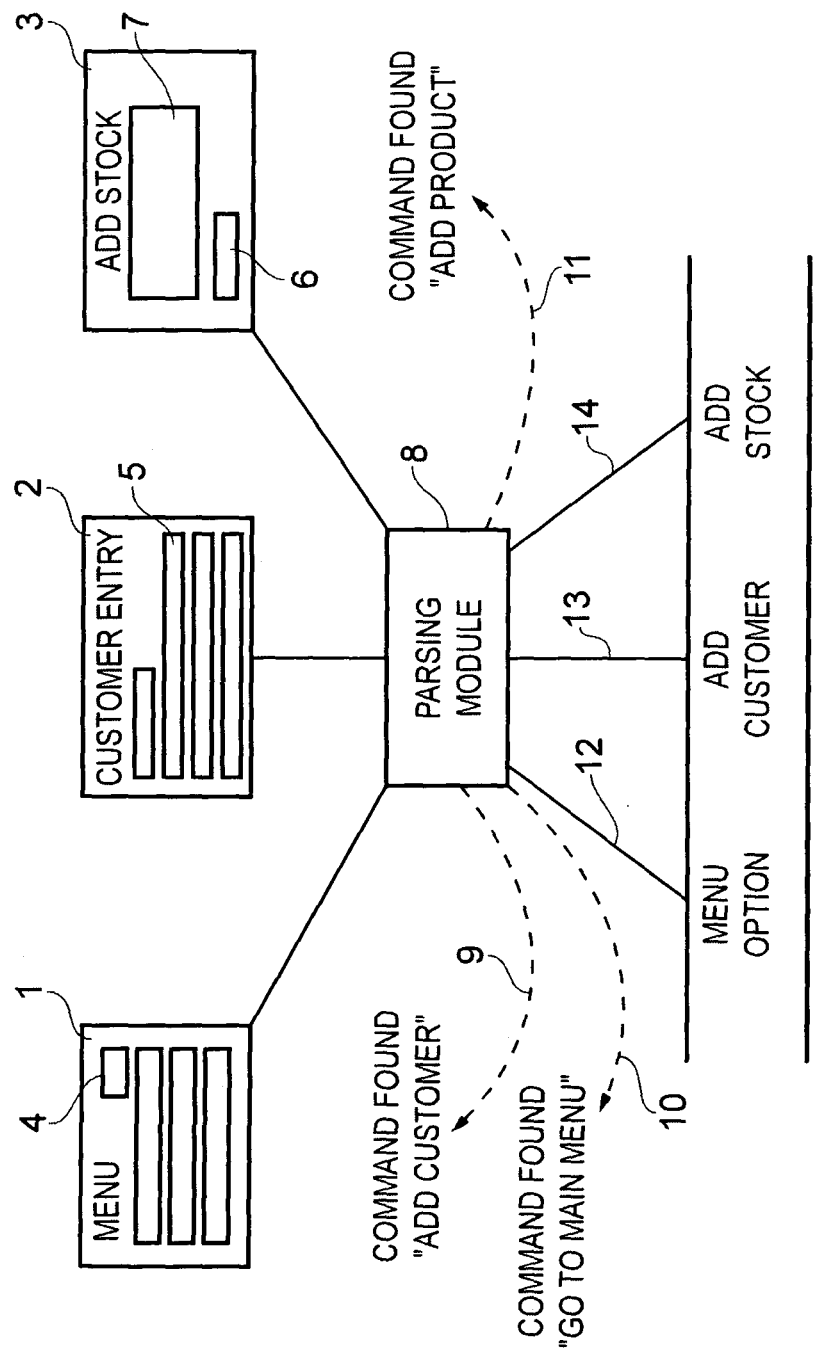

PARSING OF INPUT FIELDS IN A GRAPHICAL USER INTERFACE

CROSS-REFERENCE TO RELATED APPLICATIONS

This is a national stage application filed under 35 USC 371 based on International Application No. PCT/GB2008/002492 filed Jul. 22, 2008, and claims priority under 35 USC 119 of United Kingdom Patent Application No. 0714394.4 filed Jul. 24, 2007.

BACKGROUND OF THE INVENTION

The present invention relates to graphic user interfaces and more particularly to graphic user interfaces utilised in association with a computer mouse in order to facilitate input of information in a standard format.

It will be appreciated that increasingly access to delivery of goods and services as well as access to information and registration for services is provided through so called graphical user interfaces. These graphical user interfaces comprise a standard format form-like page and a number of input boxes at strategic locations to enable the user to input particular data as required. Movement between the input boxes is through manipulation of a cursor on a lift and place basis under the control of a hand-to-eye device such as a computer mouse. In such circumstances the user will move the cursor to the appropriate input box and then input the required data. This data may relate to a product part number or a quantity to be ordered or a delivery address.

Such graphical user interface techniques have greatly increased the ease of use and unskilled operator speeds with respect to most users. It is possible to effectively use the interface when the user has non-existent or limited, typing skills for inputting text data. However, large numbers of users have significant typing skills and can generally input data and text rapidly if given a chance.

Unfortunately with regard to skilled typists the use of input boxes in graphical user interfaces significantly slows their capabilities. Aspects to the present invention are directed towards increasing the capabilities of graphical user interfaces with skilled typists.

SUMMARY OF THE INVENTION

In accordance with aspects to the present invention there is provided a parsing method for a graphical user interface interaction process, the method comprising defining a control symbol for direction to a text based input field and defining when the control symbol is input to an input box of a graphical user interface that a processor is directed to the text based input field associated with the control symbol.

Also in accordance with aspects to the present invention there is provided an apparatus incorporating a graphical user interface including an input box, the apparatus including a processor arranged to receive information and/or commands through the input box for a specific application, the processor associated with a parsing module defining a control symbol for a text based input field whereby when the control symbol is input to the input box the parsing module is configured and/or directed to the text based input field.

Further in accordance with aspects to the present invention there is defined a parsing module to be added to a processor system for a graphical user interface, the parsing module operates in accordance with the parsing method as outlined above or included in apparatus as outlined above.

Typically, access to the input box is by direction of a cursor to the input box controlled by a hand to eye cursor manipulation device. Typically, the hand to eye cursor manipulation device is a computer mouse.

Typically the control symbol is a predefined character or character sequence. Typically, the control symbol is taken from the numerical pad of a conventional keyboard. Alternatively, the control symbol is taken from a shift key of a conventional keyboard. Typically, control symbols include *, #, £, $ and % sign.

BRIEF DESCRIPTION OF THE DRAWINGS

Aspects of the present invention will now be described by way of example and reference to the accompanying drawing in which FIG. 1 provides a schematic illustration of a graphical user interface system regime.

DETAILED DESCRIPTION

As indicated above use of graphical user interfaces has generally increased the speed and userabilty of particularly web based systems for users. These graphical user interface systems depend upon a computer mouse driven shift of the cursor to appropriate input boxes within the user interface. Such movements require constant eye to mouse (hand) co-ordination. Furthermore, it will be appreciated that in order to manipulate the computer mouse, as a manipulation device there is a requirement by the user to lift their hand from a keyboard in order to manipulate the computer mouse and position the cursor. It will be understood that the graphical user interface improves legibility for a user by providing a non-graphic input for dialogue boxes at specific locations within a graphic form or mask. In such circumstances it is clear where various elements of information or data must be input in order to proceed with the process. Furthermore, some input boxes can be defined as a mandatory field and some input boxes as discretionary fields.

A typical process utilised with regard to a graphical interface is with respect to an order form. This order form will generally list the components to be ordered, the quantity to be ordered, delivery address and name of the purchaser among potentially a wide range of other necessary data. In order to input information in to each input box as indicated a user would require movement of the computer mouse to place the cursor in the input box. Such movements significantly slow competent typists.

FIG. 1 provides a schematic illustration of a web based application utilising a graphic user interface associated with apparatus and a methodology in accordance with aspects to the present invention. Thus, a number of graphical interfaces 1, 2, 3 are defined by the necessary processing tools of the web application. Graphical interface 1 may comprise a whole menu listing available options and possibly having an input box 4 allowing a registered user to enter their "log in" details. A user interface 2 provides a number of input boxes 5 to enable a new customer to enter their details or for administrative staff to enter such details. A graphical interface 3 may provide an ability to add a stock item in an input box 6 as well as a picture or representation to be uploaded in to an input box 7.

The input boxes 4 to 7 provide convenient means for ensuring relevant information is input to appropriate databases and processing procedures to facilitate actions and applications. In such circumstances use of graphical interfaces is advantageous to processes in terms of ensuring convenient and effective operation of ordinary systems etc. In such circumstances each input box is associated with a particular action or activity. It is this specification which requires the necessary movements by a mouse and therefore hand-to-eye co-ordination and interruption in typing flow. By aspects to the present invention all input boxes are directed to a parsing module or stage. This parsing stage enables access to all applications or at least a number of applications from each individual input box. In order to provide such access a number of control symbols which can be typed in are defined for each respective activity. These control symbols will generally be those available on the numeric keypad of a conventional keyboard as well as traditional top line symbols such as a £ sign, $ sign, # and other symbols available on a conventional typewriter keypad. The control symbol will be input to the input box in order to gain access to the desired application. It will be appreciated that in order to be fully effective a typist will need to memorise the appropriate control symbol for a desired activity but such memorisation is normal with regard to skilled typists already.

FIG. 1 shows a parsing module 8 arranged to receive and monitor all inputs through input boxes 4 to 7. In such circumstances the parsing module 8 will identify control symbols or strings of symbols or phrases in order to determine whether a different command function is required or the actual input data for the input box is required. The module 8 will simply look for the control symbol or phrase and if identified will direct the processor 2 to the desired command function rather than transfer the input data in the input box 2 to the designated function associated for that particular input box. In such circumstances all input boxes can be addressed through simple keyboard strokes rather than by a computer mouse manipulation of a cursor to an input box. In such circumstances a typist can continue to type rather than have to move a hand for such mouse manipulation.

As can be seen in the drawing, if an appropriate control symbol is identified by the module 8, then the module directs the input to another input box, one suitable for different functions, such as add customer details 9, go to main menu 10 or add product 11 for example. If no control symbol or phrase is identified by the module 8, then as indicated the input data is directed to a particular input box requirement which may mean a menu option 12, add customer details 13 or add stock 14.

In normal circumstances it will be appreciated that providing the module 8 in accordance to the present invention introduces greater flexibility with regard to use of a graphical user interface. The parsing module 8 allows a skilled typist to continue typing whilst still accessing all functions as required without moving a hand to shift a computer mouse etc. It will also be appreciated that an operator will quickly build up so called "muscle memory" such that the conscious mind does not have to cognitively think or remember the appropriate signal but will through so called "muscle memory" execute the necessary control symbol or phrase to gain access to the particular text input field required. In short a user's brain learns where to move their fingers to type a given letter or word to act as a control symbol in accordance to aspects of the present invention. In such circumstances the high skills of a trained typist can be used to their full effect. The range of control symbols and words available will clearly be limited by the desired range of alpha numerical letters and numbers necessary for text data input. However, existing web applications generally do not use most common functions as applied by function keys and symbols. Certain keys will be available for defining control symbols as access indicators. It will be understood that generally input boxes used with regard to graphical user interfaces are designed for entry of quantity or product references and therefore typically only use the alphabet and numerals 0 to 9. In such circumstances symbols such as $, #, etc can be readily utilised as control symbols in accordance with aspects of the present invention.

By aspects of the present invention it will be understood that a link is defined from all or a group of input boxes so that all input boxes are monitored by the parsing module 8. This module 8 will change the input box to be dependent upon the control symbol as a navigation command. The navigation command as indicated will relate to a predefined character or word/phrase which provides instructions to the necessary or desired input box without a need for a computer mouse hand-to-eye co-ordination.

An example of an input to an input box might be "*11MULCOM" so "*" is a control symbol whilst first "1" means sales manual, second "1" (find customer) and then "MULCOM" being the customer designation. In such circumstances the keyboard parsing module 8 will move to that part of the application procedure rather than the standard entry quantity section for the current information box.

It will be appreciated that any character could be selected for the control symbol however extensive use of standard numerical keyboard characters would be quicker for a skilled user. Some examples of control symbols are as follows:—

"*1"—could mean switch to stock find module
"*2"—could mean switch to sales screen option
"-999999-" could mean find stock item whose code is 999999

Furthermore, the process and method in accordance with aspects of the present invention could be arranged to allow a skilled and knowledgeable user to fully navigate all applications without mouse hand-to-eye manipulation.

Thus, as indicated input of a phrase "*11 MULCOM" could mean to go to the sales module, find customer, MULCOM—name the customer's account number/reference. The phrase "*12" could mean go to the sales manual and then add a new customer. Alternatively, "*21AAA" could mean go to the purchase menu and find supplier AAA so that in this phrase the * indicates a control symbol then the symbol 2 indicates go to purchase menu, then the symbol 1 indicates customer or supplier and AAA may mean a code or reference number for that customer or supplier.

In view of the above it will be appreciated that control symbols can be defined for a wide range of functions and operators encouraged to learn these functions in order to improve operability and convenience of use.

Aspects to the present invention have wide usage and in particular as indicated have advantages with regard to order and data entry systems where input boxes are used as prompts to facilitate and reduce skill levels but which can impede speed with regard to skilled typists and operators. In such circumstances applicability includes applications for accounting, insurance and banking.

Aspects to the present invention can be utilised with regard to support in pre-processing and post-processing and command training. In such circumstances once an operator has pressed enter with regard to the information in data input box the parsing module will execute a number of commands in the order entered by the operator. In such circumstances the module will search the text input by the operator for the control symbols in accordance with aspects to the present invention and therefore direct the subsequent text to that function until a further control symbol is provided to another appropriate function. In such circumstances when entering a new customer initially the control system for new customer will be entered and then subsequent details with regard to address, orders, classification in terms of payment to account etc will all be entered as one continuous text stream rather than by skipping between input boxes as with prior arrangements. Furthermore, it will be appreciated that with respect to call centre type applications where telephone information is taken by an operative for input into a graphical user interface that call centre operative after skilled training and memorising appropriate control symbols will be able to continuously type the necessary data from a number of callers into the system. In such circumstances rather than a call centre operative needing to move between input boxes it will be appreciated that function change operations can be performed through direct keyboard strokes and therefore a faster response and input of text can be achieved.

As indicated above and in accordance with aspects to the present invention it is by defining the control symbols or phrases as well as provision a parsing module to review all inputs to input boxes which enables navigation throughout the application menu for a system. As indicated one approach is for operators to memorise all control symbols. Alternatively, with regard to special key keyboards programmable function keys may be associated with particular control symbols or phrases. The special key functions would then act as a Macro of the control symbol or phrase. Thus for example the key F10 could be programmed to provide "*11" that is to say an instruction to go to the sales menu, find customer and then the operator would enter an account code. An over-mask could be applied to these function keys such that a less skilled operator would be able to press the function keys rather than directly type the necessary symbol or phrase to provide the instruction.

Generally, aspects of the present invention are applicable with regard to access to functions within the particular graphical user interface that is to say page in terms of input boxes or input boxes on a different graphical user interface page. In such circumstances it may be desirable to provide an indicated control symbol phrase for the transfer to the different graphical interface pages or a programmable key transfer between the graphical interface pages.

Although any keyboard character can be used it will be appreciated in order to provide convenience and speed symbols provided by the numeric keyboard of a conventional computer keyboard would be most appropriate.

Modifications and alterations to aspects of the present invention will be appreciated by those skilled in the art. Thus, by use of aspects of the present invention a basic low-skill level procedure for use of a system is provided by the graphical user interface whilst programmable keys can be provided for control symbol transfer between input boxes and graphical interface pages and then at a high level direct typing input of the control symbols is provided. In such circumstances there is a flexible system provided in which low users or customers can have access to a system through the graphical user interface without training, intermediate skill level personnel will have access through programmable keys to improve their speed of entry and enabling the system to be used more quickly than by unskilled customers but without the high level of skill necessary from a typist rendering the system suitable for more than occasional users such as at information desks whilst at a high level such as with regard to call centre operatives training with regard to typing the control symbols will enable high speed operation. Aspects to the present invention improve flexibility and capability of systems.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A parsing method for a graphical user interface (GUI) that associates each of a plurality of user-definable control symbols with a respective text based input field of a plurality of text based input fields in at least one GUI page, the method comprising:
   receiving text data and at least one said control symbol input into a user-selectable one of at least two said text based input fields of the GUI, the control symbol selecting a destination said text based input field different from the text based input field into which the text data and at least one control symbol was received;
   parsing the received text data and at least one control symbol to automatically associate at least a part of the received text data with the destination text based input field selected with said control symbol, and regardless of which one of the at least two said text based input fields is selected by the user, where each of the plurality of text based input fields is selectable as a destination text based input field using a respective one of said plurality of user-definable control symbols.

2. A method as claimed in claim 1 wherein the control symbol is taken from the numerical pad of a conventional keyboard.

3. A method as claimed in claim 1 wherein control symbols include *, #, £, $ and % sign.

4. The method of claim 1 where the control symbol comprises a sequence of characters capable of entry through a keyboard operatively connected to the processing device.

5. The method of claim 4 including the step of parsing the sequence of characters to determine the destination text based input field associated with the control symbol.

6. The method of claim 5 including the step of using the control symbol to navigate through the GUI to the destination text based input field associated with the control symbol such that a first parsed segment of the sequence of characters is associated with a hierarchically higher level in the GUI than a different parsed segment of the sequence of characters.

7. The method of claim 6 where the first parsed segment is associated with a first page of said at least one GUI page and the different parsed segment is associated with one of a plurality of text based input fields in the first page.

8. A processing device, comprising:
   a processor;
   a memory coupled to the processor storing instructions for implementing a graphical user interface (GUI) presentable to a user;
   the GUI associating each of a plurality of user-definable control symbols with a respective text based input field of a plurality of text based input fields in at least one GUI page, the GUI comprising a plurality of first said text based input fields simultaneously displayable to the user, each capable of being selected by a user for receiving entry of text data along with at least one of the user-definable control symbols, the processor capable of using an at least one user-definable control symbol entered into a selected one of the plurality of first said text based input fields to automatically associate at least a portion of text data entered by the user into the selected one of the plurality of first said text based input fields with a destination text based input field different from the selected one of the plurality of first said text based input fields.

9. The processing device of claim 8 where the destination text based input field is one of the plurality of first said text based input fields.

10. The processing device of claim 9 where each of the plurality of first said text based input fields is selectable by said user as a destination text based input field by entering a respective one of said plurality of user-definable control symbols into any different one of the plurality of first said text based input fields.

11. The processing device of claim 8 where the control symbol comprises a sequence of characters capable of entry through a keyboard operatively connected to the processing device.

12. The processing device of claim 11 further comprising a parsing module which parses the sequence of characters to determine the destination text based input field associated with the control symbol.

13. The processing device of claim 12 where the control symbol is used by the processor to navigate through the GUI to the destination text based input field associated with the control symbol such that a first parsed segment of the sequence of characters is associated with a hierarchically higher level in the GUI than a different parsed segment of the sequence of characters.

14. The processing device of claim 13 where the first parsed segment is associated with a first page of said at least one GUI page and the different parsed segment is associated with one of a plurality of text based input fields in the first page.

15. A processing device, comprising:
    a processor;
    a memory coupled to the processor storing instructions for implementing a graphical user interface (GUI) presentable to a user;
    the GUI associating each of a plurality of user-definable control symbols with a respective text based input field of a plurality of text based input fields in at least one GUI page, the GUI comprising a first text based input field capable of being selected by a user for receiving entry of text data along with at least one of the user-definable control symbols and a second text based input field capable of being selected by a user for receiving entry of text data along with at least one of the user-definable control symbols, the processor capable of:
    using an at least one user-definable control symbol selectively entered into the first text based input field to automatically associate with the second text based input field at least a portion of text data also selectively entered by the user into the first text based input field; and
    using an at least one user-definable control symbol selectively entered into the second text based input field to automatically associate with the first text based input field at least a portion of text data also selectively entered by the user into the second text based input field.

16. The processing device of claim 15 where the control symbol comprises a sequence of characters capable of entry through a keyboard operatively connected to the processing device.

17. The processing device of claim 16 further comprising a parsing module which parses the sequence of characters to determine the destination text based input field associated with the control symbol.

18. The processing device of claim 17 where the control symbol is used by the processor to navigate through the GUI to the destination text based input field associated with the control symbol such that a first parsed segment of the sequence of characters is associated with a hierarchically higher level in the GUI than a different parsed segment of the sequence of characters.

19. The processing device of claim 18 where the first parsed segment is associated with a first page of said at least one GUI page and the different parsed segment is associated with one of a plurality of text based input fields in the first page.

\* \* \* \* \*